United States Patent [19]

Noe

[11] Patent Number: 4,735,780
[45] Date of Patent: Apr. 5, 1988

[54] AMMONIA SYNTHESIS CONVERTER

[75] Inventor: Stephen A. Noe, Houston, Tex.

[73] Assignee: The M. W. Kellogg Company, Houston, Tex.

[21] Appl. No.: 77,959

[22] Filed: Jul. 27, 1987

Related U.S. Application Data

[63] Continuation of Ser. No. 885,629, Jul. 15, 1986, abandoned.

[51] Int. Cl.$^4$ .............................................. B01J 8/04
[52] U.S. Cl. .................................... 422/148; 422/191; 422/193; 422/198
[58] Field of Search ............... 422/148, 191, 193, 198, 422/203; 423/650, 651

[56] References Cited

U.S. PATENT DOCUMENTS

| | | |
|---|---|---|
| 3,440,021 | 4/1969 | Niedetzky et al. ................ 422/148 |
| 3,475,136 | 10/1969 | Eschenbrenner . |
| 3,622,266 | 11/1971 | Laukel . |
| 3,663,179 | 5/1972 | Mehta et al. . |
| 3,694,169 | 9/1972 | Fawcett et al. . |
| 3,753,662 | 8/1973 | Pagani et al. ..................... 423/361 |
| 3,918,918 | 11/1975 | Kohn et al. . |
| 4,311,671 | 1/1982 | Notman ............................. 422/128 |
| 4,482,523 | 11/1984 | Peterson .......................... 422/128 |

OTHER PUBLICATIONS

Slack et al., *Ammonia*, PJ 3., Marcel Decker, Inc.. N.Y., 1977, pp. 197-205.

*Primary Examiner*—DAvid L. Lacey
*Assistant Examiner*—William R. Johnson

[57] ABSTRACT

A vertical, cold wall, three bed ammonia converter having upper and lower shell and tube heat exchangers wherein the lower heat exchanger is disposed axially within the upper, annular catalyst bed and preheated synthesis gas from the heat exchangers is initially converted in the middle catalyst bed which is penetrated by first, second, and third coaxial pipes. Partially converted gas from the middle catalyst bed flows upwardly through the annulus formed by the second and third axial pipes through the hot side of the lower exchanger and is then divided for parallel flow through the upper catalyst bed and, by way of the annulus formed by the first and second axial pipes, the lower catalyst bed. Converted gas from the upper and lower catalyst beds is then combined and introduced to the hot side of the upper feed/effluent exchanger.

1 Claim, 3 Drawing Sheets

AMMONIA SYNTHESIS CONVERTER

This application is a continuation of application Ser. No. 885,629, filed July 15, 1986, now abandoned.

This invention relates to vertical converters for exothermic, catalytic synthesis of ammonia from hydrogen and nitrogen. the synthesis is well known and is typically conducted at pressures within the range from about 70 to about 325 bars and temperatures within the range from about 340° C. to about 525° C.

A single converter is generally employed in modern, large capacity ammonia plants. In a 1000 metric ton per day plant, the catalyst volume will range from about 40 to about 90 $m^3$ and be contained in a converter having a diameter from about 2 to about 4 m and length or height from about 10 to about 35 m. Catalyst beds within the converter may be arranged for transverse flow, radial flow, or axial flow of gas. Axial flow converters are quite common and usually employ a cold wall, double shell design which provides a shell annulus for passage of cooling gas adjacent the outside pressure shell. The converter of the present invention is a cold wall, axial flow converter.

It is not feasible to contain the entire catalyst volume in a single catalyst bed because of reaction equilibrium considerations and the possibility of catalyst overheating and damage. It has, therefore, been common practice to arrange the catalyst in multiple beds with provision for interbed or intrabed cooling. Customarily, this cooling is provided by interbed injection of cool synthesis gas for direct heat exchange with partially converted gas (i.e.—a direct quench converter or some combination of direct gas quench with interbed heat exchangers of the shell and tube type). Converter designs which emphasize direct quench tend to be less costly than combination designs since fewer, smaller, shell and tube exchangers are employed according to the volume of quench gas introduced. Plants employing these designs do, however, suffer the penalty of higher synthesis gas compression costs since the totality of synthesis gas to the converter does not contact the totality of the catalyst therein. Therefore, more gas must be circulated to obtain a given amount of ammonia product.

From the foregoing, it may be appreciated that ammonia converters are large, complex items of equipment and that steps toward more efficient, less costly design are needed.

According to the invention a vertical, cold wall, three bed converter having two heat exchangers is provided. The three axial flow catalyst beds are arranged vertically within the cylindrical inner shell of the converter. Gas flows in series through the shell annuli, through the first, upper tubular heat exchanger around the outside of the tubes, the tube side of the second, lower heat exchanger, and then through the first catalyst bed which, physically, is the middle or intermediate bed in the converter. Gas leaving the first bed then flows through the shell side of the second, lower heat exchanger. From the lower heat exchanger, I prefer to divide the gas stream for split, parallel flow through the upper and lower beds and then recombine the converted gas prior to cooling it in the tube side of the first, upper heat exchanger from which the gas is discharged from the converter.

The converter of the invention employs no external quench gas between or within the catalyst beds. That is to say, it is a full flow converter in which the shell side of the second heat exchanger is in exclusive flow communication with respective inlet portions of the upper and lower catalyst beds. Accordingly, all of the converted gas from the upper and lower catalyst beds passes initially through the first, intermediate catalyst bed.

The catalyst beds are radially defined by respective portions of the cylindrical inner shell. A first transverse fluid barrier or partition is disposed between the upper and intermediate catalyst beds to prevent direct gas flow therebetween. Similarly, a second transverse fluid barrier or partition is disposed between the intermediate and lower catalyst beds to prevent direct gas flow therebetween. Axial conduits or other flow communication means are disposed in the catalyst beds to route gas in accordance with the process gas flow described above.

Ammonia converters are expensive high pressure equipment items and their cost increases with the internal volume required for necessary catalyst volumes and indirect heat exchangers. I have found that two heat exchangers may be accommodated in a compact vertical converter design without significantly penalizing catalyst volume by locating one of the exchangers within the upper catalyst bed and employing the intermediate catalyst bed as the first process bed. That is to say, the incoming heated synthesis gas is passed initially through the intermediate bed, cooled, and then passed through the upper and lower beds, preferably, in parallel flow. This arrangement permits use of relatively large catalyst volume in the upper and lower beds and relatively small catalyst volume in the first, intermediate bed.

Since reactant synthesis gas entering the first catalyst bed is hydrogen and nitrogen with only small amounts of other gases, the synthesis reaction is relatively fast and conversion must be limited to avoid catalyst damage from excessively high temperature. Partially converted gas from the first, intermediate bed is cooled in the second heat exchanger and the cooled, partially converted gas introduced in parallel to the upper and lower beds. This cooled gas contains ammonia and lessened amount of hydrogen and nitrogen which results in relatively slower synthesis reaction in the downstream, parallel catalyst beds as well as a higher ammonia concentration equilibrium. Accordingly, the upper and lower catalyst beds have decreased vulnerability to overheating as conversion to ammonia increases and, therefore, may contain more catalyst than the intermediate bed. For most effective utilization of the converter of the invention, the upper and lower catalyst beds contain substantially equal volumes of catalyst and catalyst volume of the intermediate bed is from 35 to 65 percent of catalyst volume in either the upper or lower catalyst bed.

Figure 1:
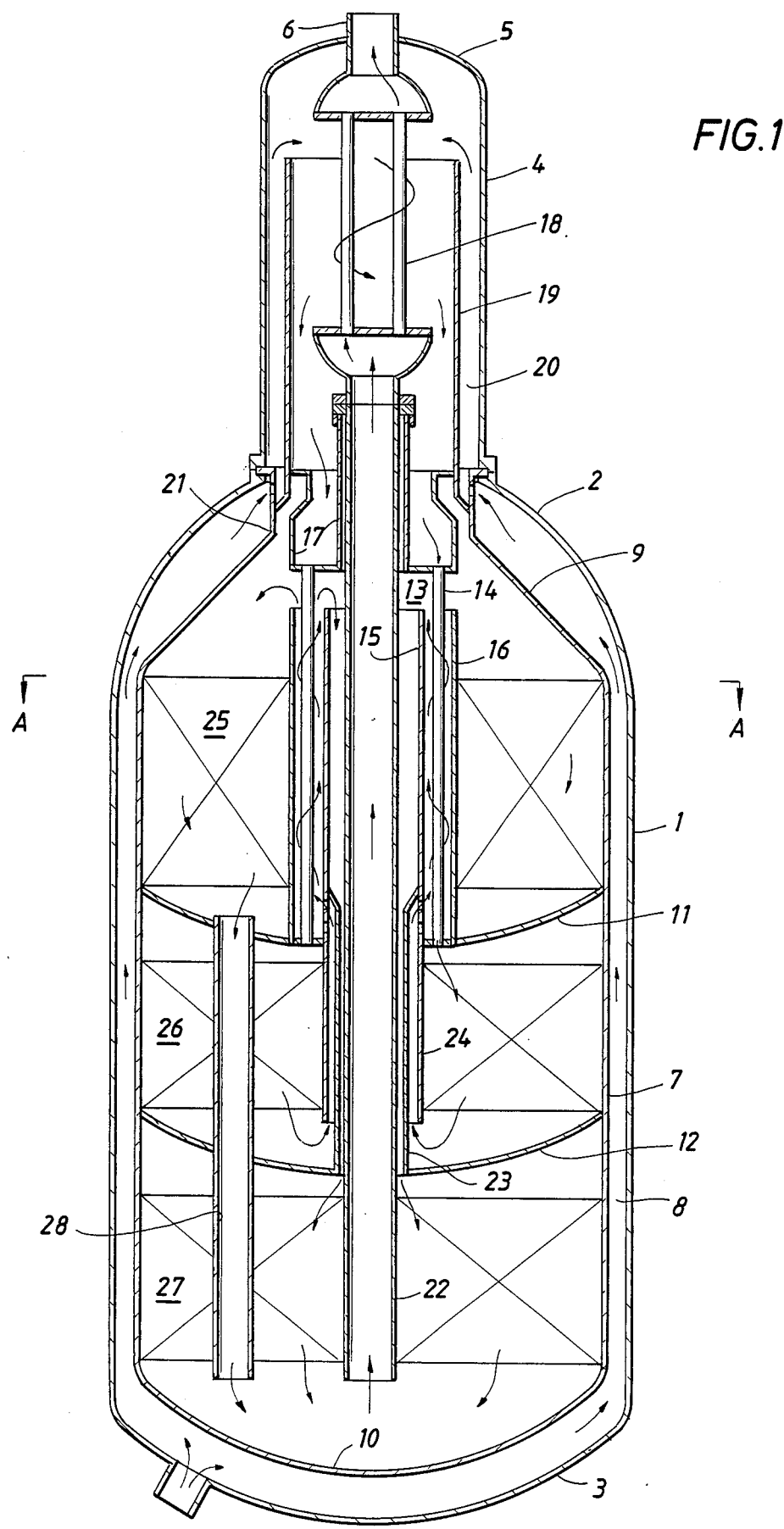
FIG. 1 is an embodiment of the invention including the preferred split, parallel flow of gas through the upper and lower catalyst beds.
Figure 2:
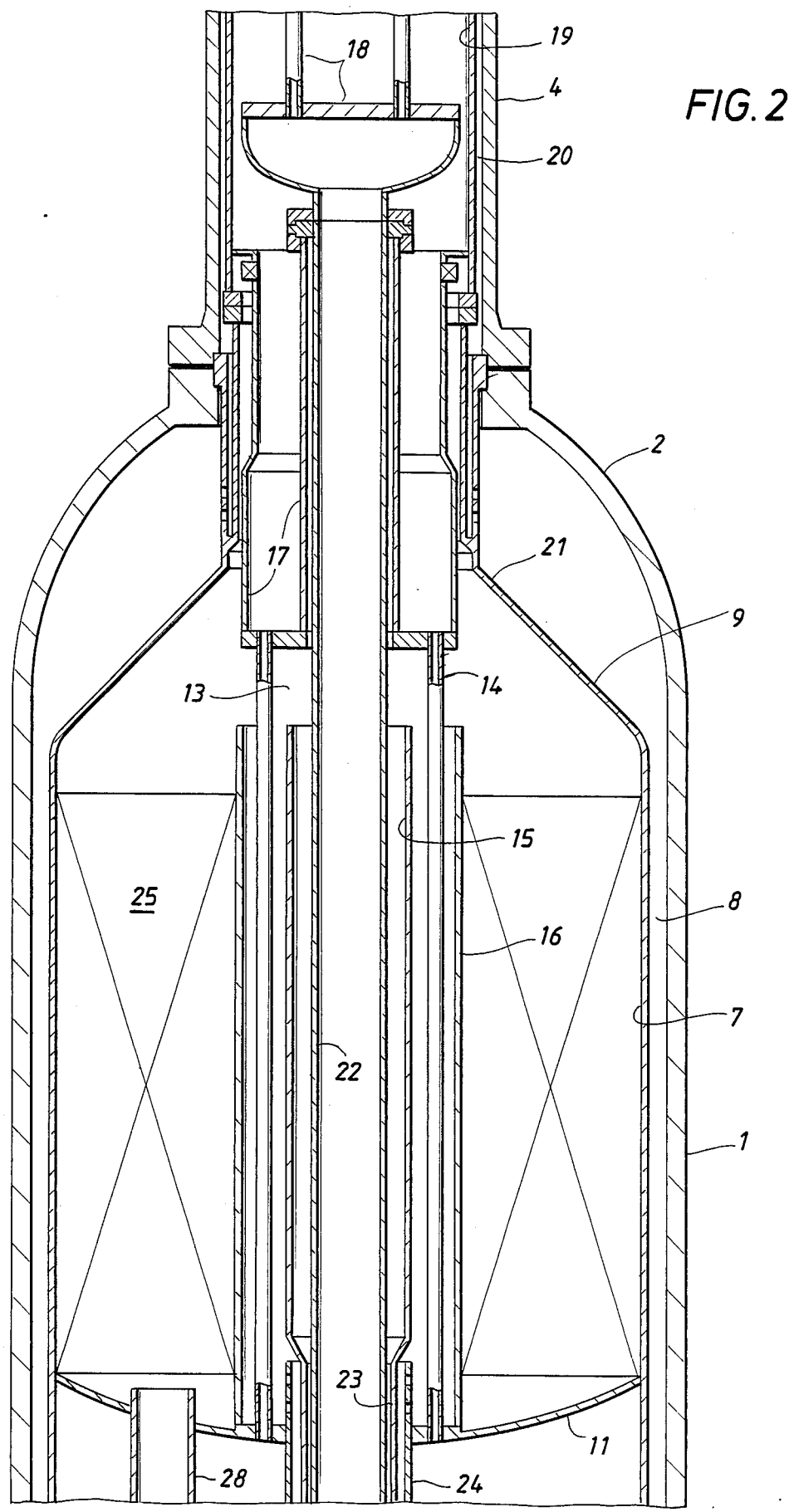
FIG. 2 is a detail of a preferred structural arrangement of the heat exchangers and upper catalyst bed.
Figure 3:
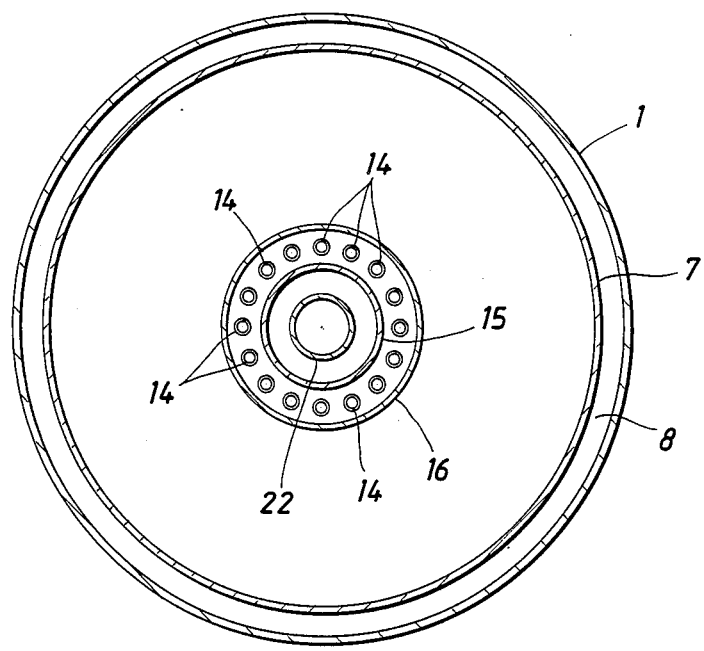
FIG. 3 is a cross-section of the converter illustrated in FIG. 1 taken at A—A.

Referring to FIG. 1, the vertical converter is contained within first cylindrical pressure shell 1 which is attached to first top outer head 2 and first bottom outer head 3. Second cylindrical pressure shell 4 having second top head 5 with gas outlet 6 extending through this head is flange mounted to a center opening in the first top head and extends vertically therefrom. The diameter of the second pressure shell is less than that of the first pressure shell, typically less than half the diameter of the first pressure shell. A first cylindrical inner shell 7 is disposed within and parallel to the first pressure shell and is spaced therefrom to form first shell annulus 8 which is in fluid communication with gas inlet means disposed in bottom outer head 3. Top inner head 9 and bottom inner head 10 are attached to the inner shell.

First transverse barrier 11 and second transverse barrier 12 are mounted within the cylindrical inner shell and sealed thereto. These barriers isolate the catalyst beds from each other and may be constructed from dished heads.

As noted, the converter of the invention contains two indirect heat exchangers. Both are vertically disposed on the axis of the converter and both heat the incoming synthesis gas. The lower exchanger 13 has an annular tube array 14, annular tube sheets, inner shell 15, and outer shell 16. For clarity, only one ring of tubes is shown in the drawings, however, conventional tube patterns with several rows are typically employed. The lower exchanger is disposed within the upper portion of the first cylindrical shell 7 and is preferably supported by the first transverse barrier 11 which has a central opening to receive the exchanger. In FIG. 1, the exchanger is supported by and sealed to the first transverse barrier at the periphery of its bottom tube sheet, however, it may be mounted somewhat higher or lower. In the latter instance the outer shell 16 of the exchanger would be sealed to the transverse barrier. The exchanger may be supported by other means such as cylindrical channel members 17, specifically the outer channel member. However, the description which follows presumes principal support by the first transverse barrier in which instance, outer channel member 17 would be fitted with an expansion joint not shown.

Inner channel member 17 is flanged at the upper end and provides support for upper tubular exchanger 18 which is fitted with bonnets on its top and bottom tube sheets and disposed, preferably entirely, within the second cylindrical pressure shell 4 at the top of the converter. The upper bonnet of the exchanger discharges cooled converted gas through gas outlet 6 which is fitted with an expansion joint not shown. Several shell arrangements may be alternatively used for the upper exchanger to convey incoming synthesis gas from the first shell annulus 8 to the hot side of the exchanger externally of the tubes. I prefer to mount second cylindrical inner shell 19 within the second pressure shell 4 in such manner that the second inner shell extends vertically upward from a center opening 21 in top inner head 9 thereby forming second shell annulus 20 which conveys gas to the upper portion of the exchanger.

Inner channel member 17 additionally supports downwardly depending first axial pipe 22 which extends throughout substantially the entire length of the cylindrical inner shell to a point proximately above bottom inner head 10.

A second axial pipe 23 surrounds a longitudinal portion of the first axial pipe and depends downwardly from inner shell 15 of lower exchanger 13 to a junction with second transverse barrier 12. Gas flow openings are provided in the lower extremity of inner shell 15 below the point from which the second axial pipe depends.

Third axial pipe 24 surrounds a longitudinal portion of the second axial pipe and depends downwardly from lower exchanger 13 from a locus inside the annular tube array, preferably, from the inner periphery of the bottom annular tube sheet. The third axial pipe extends to a point proximately above second transverse barrier 12.

The catalyst beds of the converter are annular, axially downward flow, optionally screen supported beds which are defined at their outer radii by first cylindrical inner shell 7. Upper annular bed 25 is defined at its inner radius by outer shell 16 of the lower heat exchanger. Intermediate annular bed 26 is defined at its inner radius by third axial pipe 24 and lower annular bed 27 is defined at its inner radius by first axial pipe 22.

At least one downcomer 28 depends from first transverse barrier 11 and extends through the intermediate and lower catalyst beds to a locus proximately above bottom inner head 10 so that parallel gas flows from the upper and lower beds may be combined prior to their upward flow through the first axial pipe, the tube side of upper exchanger 18, and finally gas outlet 6.

The foregoing arrangement provides for flow of reactant synthesis gas through shell annuli 8 and 20 into the cold, shell side of upper tubular exchanger 18 and the cold, tube side of lower exchanger 13. Typically, from 1 to 20 volume percent of the reactant synthesis gas by-passes one or both of the heat exchangers by means of auxiliary gas inlets (not shown) in order to provide precise temperature control of the synthesis gas entering the first catalyst bed, that is, intermediate annular bed 26.

All of the gas leaving intermediate bed 26 flows upwardly in the pipe annulus formed by second axial pipe 23 and third axial pipe 24 through the hot, shell side of lower exchanger 13 and is divided into approximately equal portions at the exchanger outlet. The first portion flows downwardly through upper catalyst bed 25 and downcomer 28 to the gas plenum space between the lower catalyst bed and bottom inner head 10. The second portion flows downwardly through the annulus formed by inner shell 15 of the lower heat exchanger and first axial pipe 22, then through the annulus formed by second axial pipe 23 and first axial pipe 22, and then through lower annular bed 27 to the gas plenum space below. The first and second gas portions are then recombined as previously described.

I claim:

1. A vertical ammonia converter comprising:
   (a) a first cylindrical pressure shell having first top and bottom heads contiguous therewith;
   (b) a second cylindrical pressure shell having a diameter less than the diameter of the first cylindrical pressure shell extending vertically from a center opening defined in the first top head, the second cylindrical pressure shell having a second top head with a gas outlet disposed therein;
   (c) a first cylindrical inner shell disposed within substantially the entire length of the first cylindrical pressure shell and forming a first shell annulus therewith, the inner shell having top and bottom inner heads contiguous with the inner shell;
   (d) a first transverse barrier disposed within and contiguous with the cylindrical inner shell;
   (e) a second transverse barrier disposed within and contiguous with the cylindrical inner shell below the first transverse barrier;
   (f) a lower shell and tube heat exchanger having an annular tube array and inner and outer shells, the exchanger being disposed within the first cylindrical inner shell and depending vertically upward from a center opening defined in the first transverse barrier;

(g) an upper tubular heat exchanger disposed within the second cylindrical pressure shell and having a tube side in fluid communication with the gas outlet;

(h) a second cylindrical inner shell disposed within the second cylindrical pressure shell and forming a second shell annulus therewith, the second inner shell extending vertically from a center opening in the top inner head and surrounding at least a portion of the upper tubular heat exchanger;

(i) a first axial pipe depending downwardly from the upper tubular heat exchanger through the lower shell and tube heat exchanger and substantially the entire length of the cylindrical inner shell;

(j) a second axial pipe surrounding a longitudinal portion of the first axial pipe depending downwardly from the inner shell of the lower shell and tube heat exchanger and terminating at a center opening defined in the second transverse barrier;

(k) a third axial pipe surrounding a longitudinal portion of the second axial pipe depending downwardly from the lower shell and tube heat exchanger;

(l) an upper annular catalyst bed defined at its annulus by the outer shell of the lower heat exchanger;

(m) an intermediate annular catalyst bed defined at its annulus by the third axial pipe and being disposed between the first and second transverse barriers;

(n) a lower annular catalyst bed defined at its annulus by the first axial pipe and being disposed below the second transverse barrier;

(o) means for serial flow of gas through the first and second shell annuli, the upper tubular heat exchanger externally of the tubes, the tube side of the lower shell and tube heat exchanger, the intermediate annular catalyst bed, and the shell side of the lower shell and tube heat exchanger; and (p) means for parallel flow of gas from the shell side of the second shell and tube heat exchanger through the upper and lower annular catalyst beds.

* * * * *